April 2, 1963 H. KLING 3,083,492
CHUMMING SINKER
Filed March 31, 1960

INVENTOR.
Herman Kling
BY 
ATTORNEY

United States Patent Office 3,083,492
Patented Apr. 2, 1963

3,083,492
CHUMMING SINKER
Herman Kling, New York, N.Y., assignor to
Murry Steingart, New York, N.Y.
Filed Mar. 31, 1960, Ser. No. 18,939
11 Claims. (Cl. 43—43.13)

The present invention relates to a fishing-line accessory; namely, to a chumming sinker, of the type which is formed with a hollow interior for fish bait and from which the fish bait is discharged in small quantities at a time, as a lure, by the jerking of the fishing line.

It is one object of the present invention to provide a chumming sinker of the character described which is so shaped so as to materially reduce the likelihood of being snagged by rocks on the bottom of the body of water wherein it is used, and which will facilitate its slipping smoothly past such rocks and other obstructions.

It is another object of the present invention to provide a chumming sinker of the character described from which the bait will be discharged in small amounts, just sufficient to serve as a lure to attract fish in the vicinity of the sinker, so as to make its bait contents last for the maximum time possible and thereby minimize the time and labor-consuming need for replacing of the bait.

It is also an object of the present invention to provide a chumming sinker of the character described whose weight may be readily and easily varied to thereby minimize the number of complete sinkers which a fisherman generally requires to carry.

It is yet another object of the present invention to provide a sinker having associated means for the rapid and easy attachment and removal of hook leads thereto, to thereby simplify and speed the process of attaching, changing and replacing of hooks.

It is a further object of the present invention to provide a sinker having associated means for attaching a hook leader without knotting or tying and without need for handling the hook proper, to thereby make the attachment and securing of hooks safer from injury to the hands and from snagging in clothing, and make practical replacement of hooks on which a fish is caught, rather than remove the fish off the hook, before casting the line again.

It is a still further object of the present invention to provide a chumming sinker of the character described which will be inhibited against rotation while being drawn through the water; to thereby prevent any undue untwisting or twisting of the line, to weaken or snap it.

It is a still further object of the present invention to provide a chumming sinker of the character described which, in spite of all the foregoing material and substantial advantages it presents for a fisherman, is nevertheless of greatly simplified construction, economical to produce and simple and easy to manipulate and use.

The foregoing and other objects and advantages of the chumming sinker of the present invention will become more readily apparent to those skilled in the art from the embodiment thereof shown in the accompanying drawings, and from the description following. It is to be understood, however, that such embodiment is shown by way of illustration only, to make the principles and practice of the invention more readily comprehensible, and without any intent of limiting the invention to the specific details therein shown.

Figure 1:
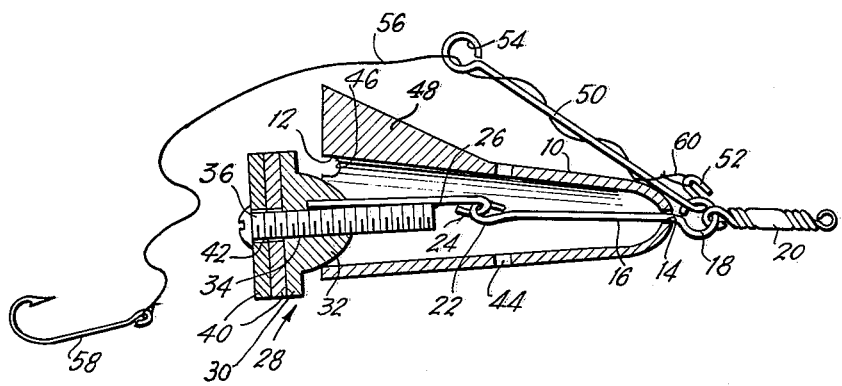
FIG. 1 is a longitudinal, sectional view through one form of a chumming sinker embodying the present invention, with the same shown in bait-releasing position, and with a hook secured by its lead line thereto.
Figure 2:
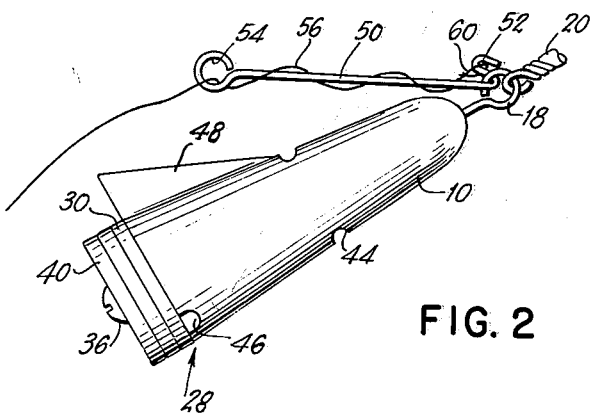
FIG. 2 is a perspective of the chumming sinker of FIG. 1, in a non-bait-releasing position.
Figure 2:

Referring now in greater detail to the embodiment of the invention illustrated in the drawings, the sinker comprises a conical or bell-shaped hollow body or housing, 10, having the opening, 12, at its wide end and an aperture, 14, at its preferably rounded apex. The housing 10 may be formed of any suitable metal, such as thin sheet metal, or other suitable material, which may, if desired, have a polished outer surface that may itself serve as a lure.

Passing through the aperture 14 is a thin rod or wire 16, which is provided at its outer ends with means for preventing its inward movement through the aperture 14. Such movement-limiting means may comprise the looped eye 18, on the exterior end of the stem 16 on which may be secured, as is conventional, a swivel 20, to which a fishing line is secured. The inner end of the rod or wire 16 may likewise have a looped eye 22, to which is hingedly attached by a correspondingly looped end 24, a second rod 26, the other end of which is set in off-center relation in a closure in the form of a lid movable toward and away from the housing opening 12, generally designated as 28, for the opening 12, which may preferably be formed of lead.

The closure 28 comprises a circular base portion 30, of a size larger than the circumference of the opening 12 of the housing 10, which is provided, on the upper surface thereof, with a preferably dome-shaped projection or stud 32, having its widest diameter slightly less than the diameter of the housing opening 12. The rod 24 is secured to the stud portion 32 of the closure 28, in off-center relation thereto, as by casting or molding the lead closure about the end of the rod 26. The closure 28 is formed with a central threaded passageway 34, in which is removably and adjustably set a screw 36, having a head. The screw 36 may be of a length that is substantially greater than the length of the threaded passageway 34 and may serve to secure on the exterior of the closure 28 one or more circular weights 40, which may be preferably formed of lead, by a central opening 44 formed in each of them through which the screw 36 is engaged.

It will be apparent that when chumming bait is placed in the housing 10 through the opening 12 and the sinker is suspended on the fishing line, the opening 12 of the housing will fit over the stud 32 and rest on the edges of the base 30 of the closure 28, to thereby close the opening. However, when the chumming sinker is dropped into the water to rest on the bottom and is juggled by the jerking of the suspending line, the closure 28 will be displaced from the housing opening 12 to permit the escape of small quantities of bait through the narrowed opening provided by the stud 32. To facilitate the discharge or escape of bait from the sinker, openings 44 are formed in the wall of the housing 10, for the inlet of water into the housing, which will help wash out some of the bait therefrom. Openings 46 may also be formed at the bottom edge of the body 10, to facilitate the washing out of the chumming material even when the opening 12 of the body is closed.

It will also be apparent that the weight of the sinker may be varied from a minimum when only the closure 28 is used to close the opening 12 to varied increased weights by the mounting on the screw 36 of one or more weighting discs 40, between its head and the outer surface of the base 30 of the closure 28. Thus, an angler or fisherman need carry only a minimum number of sinkers whose weight he can vary quickly and easily by the addition or removal of weighting discs 40, at will; such discs being relatively cheap to manufacture and compact to carry.

The body 10 may be provided, at its wider end portion, with a rudder-like blade projection 48 to keep the sinker on keel while being drawn through the water and limit its rotation to a minimum, thereby preventing the untwisting or overtwisting of the fishing line and avoiding the weakening thereof.

To facilitate the attachment of a hook 58 to the sinker, a wire rod 50, having a laterally-offset S-shaped hook 52 at one end and a looped eye 54 at its other end, may be inserted through the eye 18 of the rod 16, or through one of the eyes of the swivel 20, as before such loop is formed, and moved in such eye until the inner curve of the S-shaped hook is disposed therewithin and the outer curve thereof is disposed alongside thereof. The leader line 56 of the hook 58, which is conventionally provided with a loop 60 at its free end, is slipped through the looped eye 54 at the end of the wire rod 50 and is loosely wound around the rod, and the loop 60 is hooked over the outer curve of the S-shaped hook 52 and then the leader line 56 is pulled taut.

By this arrangement, the hook is securely held in place. When desired, as when the hook 58 is torn away or when its replacement is indicated, the leader line 56 may be readily removed by first pushing the S-hook 52 out of the eye 18, loosening the coils of the leader line 56, about the rod 50, and then removing its loop 60 from the outer curve of the hook 52. It will be apparent that this form of mounting the hook eliminates the tiresome and difficult and hazardous job of knotting and unknotting that has heretofore been required for attaching and removing the hook.

This completes the description of the chumming sinker of the present invention, of its advantages and of the method of its use. It will be readily apparent that such sinker is of relatively simple construction and easy and economical to produce and assemble. It will also be apparent that such sinker is simple and easy to use, and affords great convenience and safety in attaching and removing of hooks and that it is highly efficient for its purpose of luring fish to the vicinity of the hook.

It will also be apparent that numerous modifications and variations in the chumming sinker of the present invention may be made by anyone skilled in the art, in accordance with the principles of the invention hereinabove set forth, and without the exercise of any inventive ingenuity. I desire, therefore, to be protected for any and all such modifications and variations that may be made within the spirit of the present invention and scope of the claims hereto appended.

What I claim is:

1. A chumming sinker, comprising a one piece hollow body forming a receptacle, said body open at one end and closed at the opposed end thereof, said body having an aperture formed therethrough at said closed end, a rod inserted through said aperture into said body and projecting outwardly thereof, said rod having on its exteriorly projecting portion means inhibiting its withdrawal inwardly through said aperture and means connectable to a fishing line, a fully movable closure for the open end of said body, said closure engageable against the edge of said open end, said closure secured to the inwardly extending end of said rod for movement therewith into and out of closing position the distance between said connected closure and the movement inhibiting means on said rod being greater than the longitudinal axis of said body.

2. A chumming sinker, comprising a hollow body open at one end and closed at the other end thereof, said body having an aperture formed therethrough at said closed end, a rod inserted through said aperture into said body and projecting outwardly thereof, said rod having in its outwardly projecting portion means inhibiting its movement into said body and means engageable by a fishing line, a closure for said body, said freely movable closure having a substantially centrally formed threaded opening therethrough, a threaded element having a head adjustably engaged within said threaded opening, said closure secured to the inner end of said rod at a point to one side of said threaded opening, the distance between said closure and said aperture being greater than the longitudinal axis of said body.

3. A chumming sinker, comprising a hollow body open at one end and closed at the opposed end thereof, said body having an aperture formed therethrough at said closed end, a rod inserted through said aperture into said body and projecting outwardly thereof, said rod having means on the exteriorly projecting portion for inhibiting its movement into said body and means engageable by a fishing line, a freely movable closure for the open end of said body, said closure comprising a plate portion adapted to overlap the edges of said open end and a stud portion on the side of said plate facing said open end and adapted to fit therewithin, said closure connected to said rod by said stud, the distance between the connection of said rod with said closure stud and said aperture being less than the longitudinal axis of said body and the distance between said plate and said aperture being greater than the longitudinal axis of said body.

4. The chumming sinker of claim 3, wherein said stud is inwardly tapered, whereby it serves to guide the sides of said body to dispose the edges of said opening on said plate portion of said closure.

5. The chumming sinker of claim 3, wherein said closure is formed with a threaded opening extending therethrough along substantially the longitudinal axis of said stud and a screw having a head is removably and adjustably engaged in said threaded opening, at least one weighting plate having an opening formed therethrough engaged by said opening over said screw between its head and the outer face of said closure plate.

6. A chumming sinker according to claim 5, wherein said closure is secured to said rod by said stud at a point to one side of said opening therethrough.

7. A chumming sinker, comprising a hollow body open at one end and closed at the opposed end thereof, said body having an aperture formed therethrough at said closed end, a rod inserted through said aperture and projecting to the interior and exterior of said body, said rod having means on the exteriorly projecting portion thereof for inhibiting its movement into said body and means engageable by a fishing line, a closure for the open end of said body said closure having a marginal edge portion engageable against the edge of said open end of said body, said closure having a centrally positioned threaded opening formed therethrough, a screw removably and adjustably held in said threaded opening, said screw having a head disposed on the outer face of said closure, said closure secured to the inner end of said rod at a point alongside said threaded opening, the distance between said marginal edge portion of said closure and said aperture being greater than the longitudinal axis of said body.

8. A chumming sinker, comprising a one piece hollow body forming a receptacle, said body open at one end and closed at the other, a freely movable closure for the open end of said body, said closure engageable against the edge of said open end, a rod, said closure secured to said rod for movement therewith into and out of closing position, said body having an aperture formed at the closed end thereof, and slidably disposed over said rod by said aperture, means on said rod adjacent the closed end of said body inhibiting the movement of said body on said rod in a direction away from said closure and means on said rod adjacent said closed end of said body engageable by a fishing line.

9. The chumming sinker according to claim 8, wherein said hollow body is provided with a longitudinally-extending fin projection on its outer surface adjacent its open end.

10. The chumming sinker according to claim 8, wherein said body is provided with a longitudinally and radially extending triangularly-shaped fin on its outer surface adjacent its open end, said fin widening in the direction of said open end.

11. The chumming sinker according to claim 8, wherein said sinker is provided with means for attaching to a fishing line, said means including a loop, and wherein said sinker is provided with means for releasably securing thereto the lead line of a hook having a loop at its free end, said means comprising a relatively stiff wire having a loop at one end and a laterally-offset, S-shaped hook at its other end, said wire passing through said first-named loop and engageable thereon by the inner curve of said S-shaped hook, said hook lead line adapted to be passed through said second-named loop and wound about said rod with said hook lead line loop hooked over said outer curve of said S-shaped hook.

References Cited in the file of this patent

UNITED STATES PATENTS

| | | |
|---|---|---|
| 1,673,978 | Guindon | June 19, 1928 |
| 2,709,317 | Pease | May 31, 1955 |
| 2,765,575 | Gfroerer | Oct. 9, 1956 |
| 2,814,151 | Knapton | Nov. 26, 1957 |
| 2,928,202 | Smerke | Mar. 15, 1960 |
| 2,979,853 | Erickson | Apr. 18, 1961 |

FOREIGN PATENTS

| | | |
|---|---|---|
| 907,251 | France | June 18, 1945 |